US012025111B2

(12) United States Patent
Engrand et al.

(10) Patent No.: US 12,025,111 B2
(45) Date of Patent: Jul. 2, 2024

(54) HYDRAULIC MACHINE COMPRISING AN IMPROVED BEARING

(71) Applicant: POCLAIN HYDRAULICS INDUSTRIE, Verberie (FR)

(72) Inventors: Julien Rene Engrand, Verberie (FR); Gilles Grillon, Verberie (FR); Stephane Bernard Quertelet, Verberie (FR)

(73) Assignee: PORCLAIN HYDRAULICS INDUSTRIE, Verberie (FR)

( * ) Notice: Subject to any disclaimer, the term of this patent is extended or adjusted under 35 U.S.C. 154(b) by 174 days.

(21) Appl. No.: 17/598,716

(22) PCT Filed: Mar. 26, 2020

(86) PCT No.: PCT/EP2020/058510
§ 371 (c)(1),
(2) Date: Sep. 27, 2021

(87) PCT Pub. No.: WO2020/193694
PCT Pub. Date: Oct. 1, 2020

(65) Prior Publication Data
US 2022/0145866 A1    May 12, 2022

(30) Foreign Application Priority Data
Mar. 27, 2019  (FR) ........................................ 1903205

(51) Int. Cl.
*F04B 1/047*    (2020.01)
*F03C 1/047*    (2006.01)
(Continued)

(52) U.S. Cl.
CPC .............. *F04B 1/047* (2013.01); *F03C 1/047* (2013.01); *F16C 17/10* (2013.01); *F16C 33/046* (2013.01);
(Continued)

(58) Field of Classification Search
None
See application file for complete search history.

(56) References Cited

U.S. PATENT DOCUMENTS

| 691,173   | A | * | 1/1902 | Perkins  | F16C 33/526 |
|           |   |   |        |          | 384/552 |
| 1,876,690 | A | * | 9/1932 | Kingsbury | F16C 17/06 |
|           |   |   |        |          | 384/303 |

(Continued)

FOREIGN PATENT DOCUMENTS

| DE | 3706571 A1  | 9/1988 |
| DE | 19902565 A1 | 7/2000 |

(Continued)

OTHER PUBLICATIONS

Machine Translation of EP0191674 (Obtained from USPTO Search, Clarivate Analytics, 2023) (Year: 2023).*

(Continued)

*Primary Examiner* — Connor J Tremarche
*Assistant Examiner* — Geoffrey S Lee
(74) *Attorney, Agent, or Firm* — WOMBLE BOND DICKINSON (US) LLP

(57) ABSTRACT

A hydraulic piston machine including a housing, a shaft that is able to rotate relative to the housing, and a cam secured to one of the housing or the shaft. A cylinder block includes pistons that are able to move in the cylinder block opposite the cam in order to generate relative rotation between the cylinder block and the cam. The cylinder block is linked in rotation to the other of the shaft or the housing. A mechanism forms rotation guide bearings for guiding the rotation of the shaft relative to the housing, which mechanism includes a tapered plain bushing interposed between a housing element and an element linked in rotation with the shaft and in which the tapered plain bushing includes a radial through-slit (Continued)

extending through the entire radial dimension of the bushing.

31 Claims, 11 Drawing Sheets

(51) Int. Cl.
F16C 17/10 (2006.01)
F16C 33/04 (2006.01)
F16C 33/10 (2006.01)

(52) U.S. Cl.
CPC ...... *F16C 33/1065* (2013.01); *F16C 2360/42* (2013.01)

(56) References Cited

U.S. PATENT DOCUMENTS

| | | | | |
|---|---|---|---|---|
| 1,954,685 A * | 4/1934 | Stanton | ............... | F16C 33/6622 409/135 |
| 2,245,743 A * | 6/1941 | Aspin | ............... | F01L 7/08 123/190.14 |
| 2,389,687 A * | 11/1945 | Rickenmann | ............ | F16C 35/08 384/218 |
| 2,646,755 A * | 7/1953 | Joy | ............... | F01B 1/0672 60/490 |
| 3,009,747 A * | 11/1961 | Pitzer | ............... | F16D 1/094 411/24 |
| 3,439,962 A * | 4/1969 | Gothberg | ............... | F16C 17/18 384/107 |
| 3,453,031 A * | 7/1969 | Bjork | ............... | F16C 32/067 384/118 |
| 3,628,835 A * | 12/1971 | Cornish | ............... | F16C 33/46 384/465 |
| 3,659,911 A * | 5/1972 | Kessler | ............... | B23Q 1/385 384/110 |
| 4,105,267 A * | 8/1978 | Mori | ............... | F16C 33/046 384/291 |
| 4,159,152 A * | 6/1979 | Bjork | ............... | F16C 32/0644 384/291 |
| 4,304,445 A * | 12/1981 | Goloff | ............... | F16C 25/04 384/261 |
| 4,317,601 A * | 3/1982 | Faigley, Jr. | ............... | F16C 33/4635 384/576 |
| 4,459,048 A * | 7/1984 | Stachuletz | ............... | F16C 17/026 384/291 |
| 4,494,889 A * | 1/1985 | Thompson | ............... | F16D 1/096 403/4 |
| 4,576,488 A * | 3/1986 | Steiner | ............... | F16C 33/102 384/291 |
| 5,115,890 A * | 5/1992 | Noel | ............... | F04C 15/0084 188/170 |
| 5,961,219 A | 10/1999 | Maughan | | |
| 6,468,194 B2 * | 10/2002 | Wojtkowski, Jr. | ....... | F16C 13/02 492/1 |
| 6,494,126 B1 * | 12/2002 | Leinonen | ............... | F03C 1/0441 91/496 |
| 7,635,225 B2 * | 12/2009 | Lajiness | ............... | F16N 7/363 384/462 |
| 8,215,928 B2 * | 7/2012 | Agrawal | ............... | F04D 29/057 417/373 |
| 8,585,294 B2 * | 11/2013 | Drigani | ............... | F16C 35/02 384/118 |
| 9,022,656 B2 * | 5/2015 | Burgeff | ............... | F16C 27/063 384/276 |
| 10,221,831 B2 * | 3/2019 | Masson | ............... | F04B 1/0404 |
| 10,400,882 B2 * | 9/2019 | Ziskovsky | ........... | F16C 33/7813 |
| 11,193,544 B2 * | 12/2021 | Greinwald | ............... | F16C 27/02 |
| 2007/0081748 A1 * | 4/2007 | Sitter | ............... | F16C 17/022 384/294 |
| 2011/0262064 A1 * | 10/2011 | Burgeff | ............... | F16C 33/208 384/220 |
| 2011/0317950 A1 * | 12/2011 | Lee | ............... | F16C 17/105 384/112 |
| 2019/0076976 A1 | 3/2019 | Gerst et al. | | |
| 2019/0113124 A1 * | 4/2019 | Ziskovsky | ............... | F16C 43/04 |

FOREIGN PATENT DOCUMENTS

| | | |
|---|---|---|
| EP | 0191674 A1 | 8/1986 |
| EP | 1072814 A1 | 1/2001 |
| EP | 2531720 A1 | 12/2012 |
| EP | 2841763 A2 | 3/2015 |
| EP | 3290726 A1 | 3/2018 |
| FR | 2155640 A5 | 5/1973 |
| FR | 2298017 A1 | 8/1976 |
| FR | 0191674 A1 * | 8/1986 |
| FR | 2582058 A1 | 11/1986 |
| FR | 2651836 A1 | 3/1991 |
| FR | 2796886 A1 | 2/2001 |
| GB | 1407405 A | 9/1975 |
| WO | 98/30800 A1 | 7/1998 |
| WO | 2011/092312 A1 | 8/2011 |
| WO | 2013/160145 A2 | 10/2013 |
| WO | 2017/149162 A1 | 9/2017 |

OTHER PUBLICATIONS

Office Action received for European Patent Application No. 20713000.6, mailed on Mar. 20, 2023, 15 pages (8 pages of English Translation and 7 pages of Original Document).
International Preliminary Report on Patentability received for PCT Patent Application No. PCT/EP2020/058510, mailed on Oct. 7, 2021, 16 pages (8 pages of English Translation and 8 pages of Original Document).
International Search Report and Written Opinion received for PCT Patent Application No. PCT/EP2020/058510, mailed on Jun. 25, 2020, 19 pages (8 pages of English Translation and 11 pages of Original Document).
Preliminary Research Report received for French Application No. 1903205, mailed on Dec. 4, 2019, 2 pages (1 page of French Translation Cover Sheet and 1 page of original document).
Communication about intention to grant a European patent received for European Application No. 20713000.6, mailed on Nov. 9, 2023, 6 pages.
Notification of Second review Observations received for Chinese Patent Application No. 202080038186.3, mailed on Sep. 27, 2023, 100 pages (50 pages of English Translation and 50 pages of Original Document).

* cited by examiner

HYDRAULIC MACHINE COMPRISING AN IMPROVED BEARING

TECHNICAL FIELD

The present invention relates to the field of hydraulic machines.

The present invention relates in particular, but not exclusively, to hydraulic machines with radial pistons.

PRIOR ART

Many types of hydraulic machines have already been proposed.

An embodiment of a machine according to the prior art, such as illustrated in the attached FIGS. 1 and 2, is disclosed in document FR 2 796 886.

The attached FIGS. 1 and 2 illustrate a hydraulic machine which essentially comprises five additional assemblies: a housing 10, a shaft 20, an assembly 30 forming motor or pump arranged between the housing 10 and the shaft 20, means 40 forming guide bearings rotating relative of the shaft 20 relative to the housing 10, around the axis O-O, and a brake 50. The housing 10 is intended to be fixed to the chassis of a machine or a vehicle.

Each of the above five assemblies can form the object of many variant embodiments.

According to the embodiment shown in FIGS. 1 and 2, the housing 10 comprises a multiple lobe cam 12 sandwiched between two lateral elements 14, 16 of the housing.

According to the embodiment shown in FIGS. 1 and 2, the shaft 20 comprises a central element 22, a radially external element 24 and a linking disc 26 between an axial end of the central element 22 and an axial end of the radially external element 24.

The shaft 20 supports a power take-off 28 adapted to carry an accessory which must be driven in rotation, for example the rim of a wheel or any other equipment, in the event where the machine constitutes a motor.

In the event where the machine constitutes a pump, the power take-off 28 receives a mechanical motor torque applied to the entry of the machine.

The lateral housing element 16 has a longitudinal axial extension 18 interposed between the central element 22 and the radially external element 24. The longitudinal axial extension 18 is connected to the lateral housing element 16 by a linking element 19, transversal to the axis O-O of the machine and in the general form of a washer.

The machine illustrated in the attached FIGS. 1 and 2 comprises an assembly 30 of motor or radial piston pump type, and is known per se.

The assembly 30 forming the motor or pump essentially comprises a distributor 32, a cylinder block 34 which comprises a plurality of radial cylinders 35 each housing a respective piston 36 each bearing a roller 38 supported against the cam 12 attached to the housing 10.

The number of cylinders 35 and therefore pistons 36 of the cylinder block 34 differs from the number of lobes of the cam 12.

According to FIGS. 1 and 2, the cam 12 is radially external and the cylinder block 34 located radially inside the cam 12 has cylinders 35 which terminate radially towards the outside, opposite the cam 12.

As is known per se, when the distributor 32 cyclically applies a pressurised fluid inside the cylinders 35, the stress from the pistons 36 and associated rollers 38 on the cam 12 drives the cylinder block 34 in rotation relative to the cam 12 and consequently relative to the housing 10. The distributor 32 is fed via the element 14 which forms a lid and fitting for powering the distributor.

Since the cylinder block 34 is linked rotationally to the central element 22 of the shaft 20 by a longitudinal system of splines 23, it is clear that in this case the shaft 20 is driven in rotation by the pressure of the fluid applied by the distributor 32. The hydraulic machine in this case constitutes a motor.

Yet when mechanical force is applied by the power take-off 28 to the shaft 20 in the direction of driving in rotation relative to the housing 10 around the axis O-O, displacement of the rollers 38 and pistons 36 relative to the lobes of the cam 12 causes a variation in volume of the cylinders 35 and consequently applies fluid pressure to the distributor 32. The machine then operates as a pump.

This machine is reversible, and therefore operates variously as pump or motor, and can also turn in two directions of rotation.

According to the illustration given in FIG. 1, the means forming bearings 40 are constituted by two tapered roller bearings 42, 44 interposed between the central element 22 of the shaft 20 and the housing element 18, itself interposed between the central element 22 of the shaft 20 and the radially external shaft element 24.

The bearings 42, 44 are dimensioned to support the axial and radial forces which are exerted on the shaft 20. Since the support surface of the rollers or the balls is limited to a contact generator, the contact pressure is very high. To lower this contact pressure and produce bearings which have a good service life, there is the temptation to increase the number of rollers. But this produces bearings of large diameter, which are very bulky, expensive, and need a large-diameter shaft. This increases the bulk of the machine and its cost, in the region of the bearing.

The power take-off 28 can be any type, to execute driving in rotation. This can be a tapered shaft output, or a pin, or a sprocket for a chain or a sprocket wheel. As in FIG. 1 this can be also for example a flange intended to receive a vehicle wheel.

The assembly of the shaft 20 and of the fastener 28 forms a hub, for example a wheel hub, carried by the bearing means 40 and the part 18 of the housing element.

According to the embodiment given in FIG. 1, the brake 50 is of the disc brake type.

It is formed by a stack of discs connected alternatively in rotation, some on the shaft 20, more precisely in this case on the radially external element 24, and the others on the housing element 18 arranged between the central element 22 of the shaft 20 and the radially external element 24.

The disc brake 50 is arranged on the axial end of the machine adjacent to the power take-off 28, that is, near the power take-off 28, opposite the distributor 32 relative to the cylinder block 34.

As is seen in FIG. 1, the alternated discs of the brake 50 are stressed in mutual support, therefore in braking position, by an elastic element 56, for example of Belleville washer type.

The elastic element 56 is arranged between on the one hand an element of the housing, for example the element 19 which ensures linking between the lateral element 16 and the axial extension 18, and on the other hand a piston 51.

A force antagonistic to the elastic element 56 can be applied by injection of fluid pressure into a control unit 58 to place the brake 50 in release position.

BASIS OF THE INVENTION

The aim of the present invention is to improve hydraulic machines of the type illustrated in the attached FIGS. 1 and 2.

The aim of the present invention in particular is to propose a novel hydraulic machine which is compact and supports heavy loads.

Attempts have been made in fact over many years to make refinements to the hydraulic machine of the type illustrated in the attached FIGS. 1 and 2.

Examples of such propositions are disclosed in documents EP 1 072 814, EP 2 841 763 and WO 98 30800.

But the majority of attempts for improvement proposed has not given total satisfaction.

The above aims are achieved within the scope of the present invention due to a piston hydraulic machine comprising:
- a housing,
- a shaft mobile in rotation relative to the housing,
- a cam attached to one of the housing or the shaft,
- a cylinder block comprising pistons mobile in the cylinder block opposite the cam for generating relative rotation between the cylinder block and the cam, said cylinder block being linked rotationally to other of the shaft or the housing,
- means forming rotating guide bearings of the shaft relative to the housing, the means forming rotating guide bearings comprising a conical plain bushing interposed between a housing element and an element linked rotationally to the shaft, the conical plain bushing comprising a radial slot.

According to optional characteristics of the invention:
- the conical plain bushing is interposed between the cylinder block and a housing element,
- the conical plain bushing is interposed between a housing element and a conical ring linked rotationally to the shaft,
- the cylinder block comprises pistons mobile radially in the cylinder block and the cam is a multilobed cam.
- the conical plain bushing is produced by a rolling technique,
- the conical plain bushing comprises anti-rotation means relative to a support element, for example in the form of at least one radial tab,
- the conical plain bushing comprises means such as notches ensuring covering by lubricating fluid over the entire surface of the conical plain bushing in relative displacement with respect to the facing piece,
- the conical plain bushing comprises notches on one at least of its external periphery and/or its internal periphery to provide an oil inlet onto the surface of the conical bushing,
- the oil inlet notches are adjacent to anti-rotation tabs provided on the radially external edge of the conical bushing,
- the conical bushing comprises oil inlet notches on its radially external edge and complementary notches in its mass or on its radially internal edge,
- the largest radius of the notches formed in the mass or on the radially internal edge of the conical bushing is greater than the smallest radius of the notches terminating on the radially external edge of the conical bushing,
- the conical plain bushing comprises radial oil passage lumens opposite anti-rotation tabs,
- the bushing comprises two sets of angularly offset and separated lumens or notches covering radial ranges which are superposed such that the lumens and notches in addition cover the entire radial extent of the bushing,
- one of the elements adjacent to the conical plain bushing, cylinder block and housing or shaft elements, or even ring support, comprises a low stop wall of the conical plain bushing placed opposite one of its peripheral edges, preferably its radially external peripheral edge,
- the element which defines the above low wall comprises a clearance opposite the low wall allowing at least slight flexing of the carrier element of the low wall, to reduce pressure on the edges of the bushing,
- one of the elements adjacent to the conical plain bushing, cylinder block and housing or shaft elements, or even ring support, has a clearance opposite the conical bushing avoiding direct support on the conical bushing over the entire radial extent thereof.

According to other optional advantageous characteristics of the invention:
- the machine comprises a brake,
- the brake is a disc brake,
- the brake comprises a control unit,
- the brake is stressed by an elastic element in braking position and the brake comprises a chamber adapted to receive release pressure,
- the conical plain bushing is placed in a fluid such as oil.

According to a particular embodiment, the hydraulic machine comprises the conical plain bushing clamped between a housing element and the cylinder block or a ring support and comprises a clamping system with pre-tension of the conical plain bushing.

The present invention also relates per se to conical plain bushings of the above type.

The present invention also relates to machines, such as vehicles or any construction machine, equipped with at least one hydraulic machine of the above type.

DESCRIPTION OF THE FIGURES

Other characteristics, aims and advantages of the present invention will emerge from the following detailed description and in relation to the appended drawings given by way of non-limiting examples and in which.

DETAILED DESCRIPTION OF THE INVENTION

Initially the general architecture of the hydraulic machine according to the present invention illustrated in the attached FIG. 3 will now be described.

Figure 1:
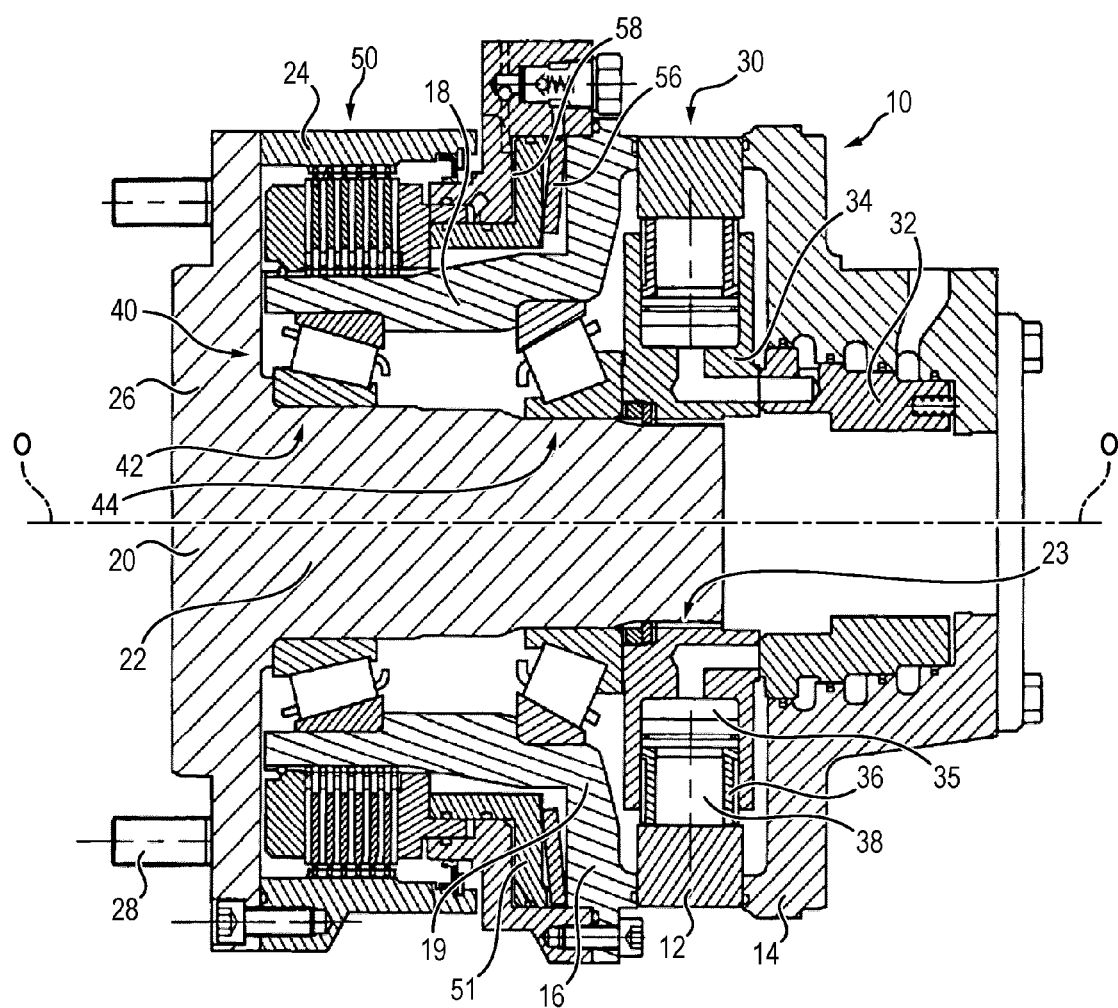
FIG. 1 previously described illustrates a view in longitudinal axial section of an embodiment of a hydraulic machine according to the prior art, FIG. 2 also previously described illustrates a view in transversal section of the cylinder block element of such a machine according to the prior art.
Figure 2:
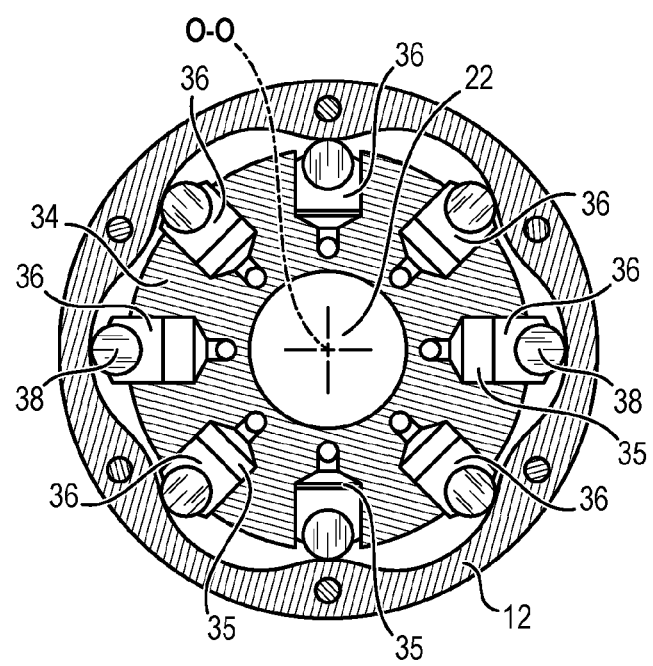
Figure 3:
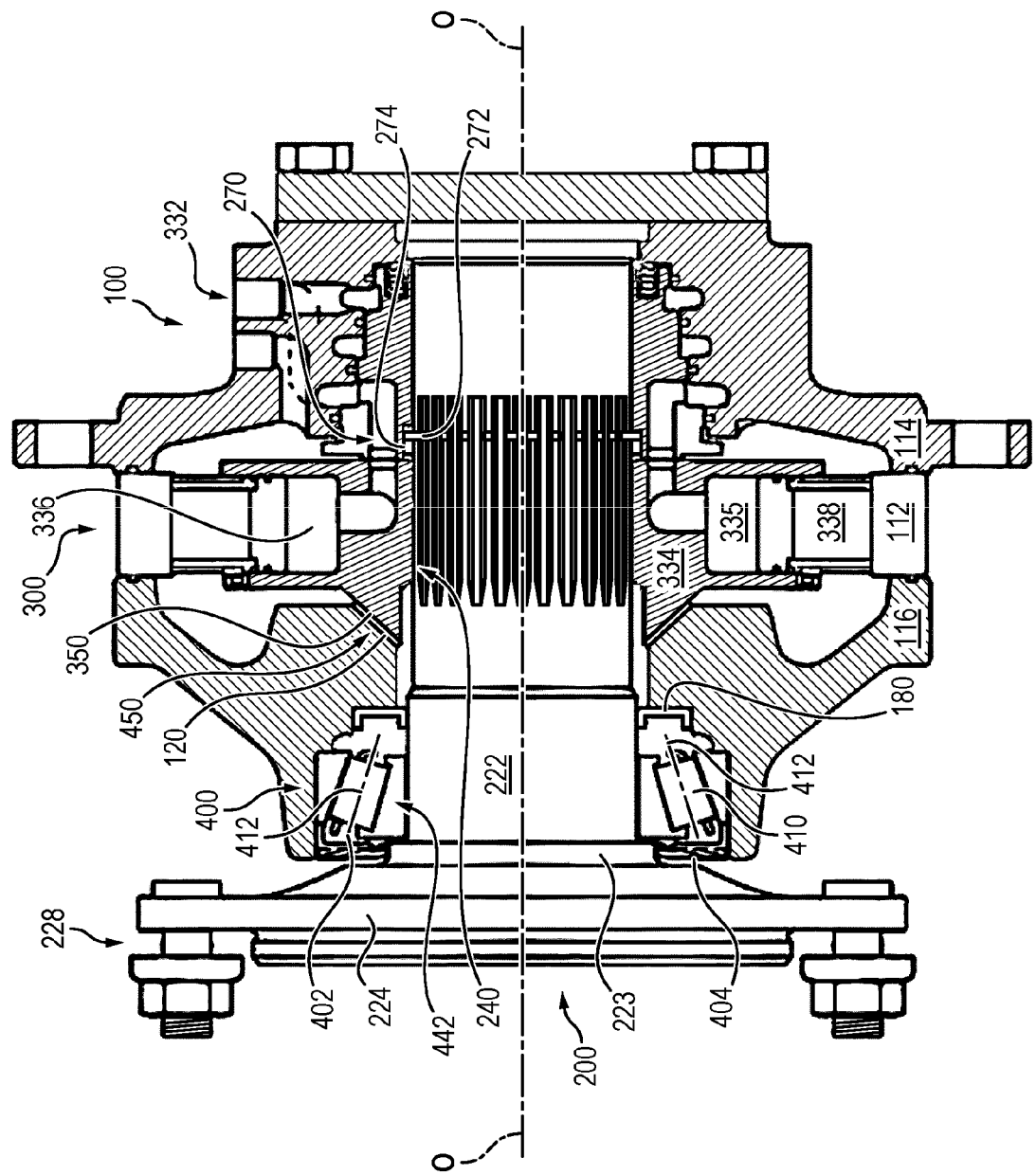
FIG. 3 illustrates a view in longitudinal axial section of a hydraulic machine according to an embodiment of the present invention.

FIG. 3 shows a hydraulic machine mainly comprising four assemblies: a housing 100, a shaft 200, an assembly 300 forming a motor or pump and means 400 forming rotating guide bearings of the shaft 200 relative to the housing 100.

Where appropriate, the machine according to the present invention can also be fitted with a brake placed between an element of the housing 100 and an element of the shaft 200, for example a disc brake of the type illustrated in FIG. 1.

Each of these assemblies can itself form the subject of many embodiments. They will therefore not be described in detail hereinbelow.

The general structure and the general function of each of these assemblies will be simply recalled.

The housing 100 is intended to be fixed to the chassis of a machine or a vehicle. It mainly comprises a multilobed cam 112 arranged between two lateral housing elements 114, 116.

The shaft 200 comprises a shaft element or central trunnion 222 centered on the axis of the machine O-O.

One end of the trunnion 222 which emerges on the outside of the housing 100 forms a power take-off 228 adapted to support any appropriate accessory, for example the rim of a wheel, a sprocket wheel, or any equivalent means.

This axial end emerging from the shaft 200, which bears the power take-off 228 is flared in the form of a tray 224.

According to the particular embodiment shown in FIG. 3, the assembly 300 forming motor or pump is constituted by a sub-assembly with radial pistons.

As is known per se, this assembly 300 comprises a distributor 332, a cylinder block 334 having a plurality of radial cylinders 335 each taking up a piston 336 fitted at its radially external end with a roller 338 supported on the multilobed cam 112.

As is known per se, the number of cylinders 335 of the cylinder block 334 preferably differs from the number of lobes of the multilobed cam 112.

Therefore, when the motor is running, since a pressurised fluid is applied to the cylinders 335 by the distributor 332, the force exerted by the pistons 336 and the rollers 338 on the lobes of the cam 112 causes rotational torque between the cylinder block 334 and the cam 112.

The distributor 332 generally comprises a central part sliding axially in the housing part 114 forming a lid, and indexed in rotation by the latter, to form a sliding link. The central part of the distributor bears throats in general tiered for it to be supplied by the piece 114 forming a lid and supply connection towards the outside of the machine. If the throats are tiered, the distributor 332 receives thrust for applying to the cylinder block 334, which produces the sliding rotary seal for supplying the orifices of piston chambers of the block 334. The block 334 is mobile in rotation, and the central part of the distributor 332 is mobile axially and pressed against the block 334 by the thrust. The interface between the block 334 and the distributor 332 therefore creates a rotary seal. Thrust springs between the central part of the distributor 332 and the housing element 114 maintain minimal thrust permanently. The two pieces 332, 334 in relative rotation let the cylinders 335 connect alternatively in supply or when emitting on the hydraulic supply lines of the machine.

When the pump is running, rotary torque is applied to the shaft 200, typically by means of the power take-off 228. Relative rotation of the cylinder block 334 relative to the housing 100 causes displacement of the pistons 336 on the cam 112 and as a consequence a cyclic variation in the volume of the cylinders 335 which generates output of pressurised fluid leaving the distributor 332.

The distributor 332 has channels intended to ensure that the oil is conveyed between the cylinders 335 and the outside of the machine.

Such an assembly 300 is described for example in documents FR 2651836, FR 2582058 and EP 2531720.

It therefore will not be described in any more detail hereinbelow.

The cylinder block 334 is linked rotationally to the central shaft element 222 by means of additional axial splines 240.

As is also seen in FIG. 3, according to the invention the means 400 forming a bearing comprise a bearing 442 comprising tapered rollers 410 and a conical plain bushing 450 interposed between an element of the housing 100 and an element linked rotationally to the shaft 200.

More precisely according to FIG. 3, the tapered roller bearing 442 is interposed between the distal end of the lateral element 116 of the housing 100 and the distal end of the shaft 222 near the power take-off 228.

The bearing 442 and the conical bushing 450 are placed on the side of the cylinder block 334 opposite the distributor 332.

Tapered roller bearing means a bearing having cylindrical revolving rollers, or even truncated, but whereof the individual axes 412 are distributed over a cone. The roller bearing 442 is preferably placed in the lubricant.

For this purpose it is preferably placed in a chamber 402 closed axially on one side by a joint 180 and on the other side by a joint 404.

Also, the conical bushing 450 is interposed between the housing 100 and the cylinder block 334. It is preferably placed in the oil.

For this purpose, the housing 100, more precisely the lateral housing element 116, bears the above joint 180 supported on the shaft 222 and ensuring insulation between the chamber 402 filled with lubricant containing the bearing 442 and the chamber housing the conical plain bushing 450.

More precisely, the conical plain bushing 450 is interposed on one side between an element of the housing 100 connected to the housing element 116 and the cylinder block 334 on the other side.

More precisely still, the conical plain bushing 450 is interposed between a conical bearing seat 120 formed on the housing 100 in the region of the lateral element 116, and a conical bearing seat 350 formed on the cylinder block 334.

The two bearing seats 120, 350 are parallel to each other.

The conical plain bushing 450 and the conical bearing seats 120, 350 have their concavity directed opposite the axial distal end of the machine near the power take-off 228. The concavity of the conical plain bushing 450 and of the conical bearing seats 120, 350 is therefore directed towards the distributor 332.

The axes 412 of the rollers 410 of the bearing 442 preferably converge towards the axis O-O in approaching the distributor 332. Therefore the axes 412 of the rollers 410 rest on a cone whereof the concavity is directed opposite the distributor 332, or towards the distal end of the machine. In other terms the bearing 442 and the conical bushing 450 preferably have their concavities oriented in opposite directions.

The bearing seats 120, 350 and the conical plain bushing 450 will be described in more detail hereinbelow.

The axial force exerted by the distributor 332 tends to thrust the cylinder block 334 axially on the conical bushing 450. This conical bushing 450 creates direct support on the bearing body formed by the lateral housing element 116, in the region of the conical bearing seat 120.

The conical plain bushing 450 takes up both the axial forces due to the axial thrust of the distributor 332 and the cyclic radial forces resulting from displacement of the rollers 338 on the multilobed cam 112. Without these radial forces exerted by the cylinder block 334 being absorbed, the shaft 200 would be subject to oscillations resulting from variable thrusts due to this cylinder block 334 whenever the pistons 336 pass the lobes of the cam 112.

The housing 100 and more precisely at least the conical bearing seat 120 is preferably made of cast iron or made of molten or moulded steel, by casting processes. The cylinder block 334 is preferably made of machined and processed steel, optionally after forging.

Therefore, the conical plain bushing 450 is preferably mounted static on the housing body 100, more precisely on the lateral element 116, that is, fixed relative to the latter. In contrast it is sliding, with relative rotation, relative to the cylinder block 334.

In fact, the cylinder block 334 made of machined and processed steel is plainer and harder than the rough casting of the housing 100.

Also, the conical plain bushing 450 preferably responds to the following characteristics as to its composition.

First of all, the surface 452 of the conical plain bushing 450 which rests on the surface opposite in relative displacement in rotation, or in this case the bearing seat 350 of the cylinder block, is adapted to present a surface state with low friction coefficient. This low friction coefficient can be achieved by surface treatment of the conical plain bushing 450, on its surface 452. The low friction coefficient can also be achieved by the choice of material making up this surface 452. For this purpose the surface 452 can be formed by a synthetic material with low friction coefficient or even by a material called 'sliding', for example based on polyvinylidene fluoride (PVDF) or polyetheretherketone (PEEK). The surface 452 can also be loaded by sliding particles, such as particles of bronze or pieces of fluorinated synthetic material, for example polytetrafluoroethylene.

Secondly, the conical plain bushing 450 can be composed of a core, for example a core made of steel, on which a layer of low friction coefficient material is deposited, such as mentioned hereinabove, if needed with interposition of an intermediate layer adapted to ensure adhesion of the superficial layer with low friction coefficient. This type of intermediate layer can be formed based on bronze, for example bronze balls, or a porous sintered material, for example agglomerated and fixed onto the core by fusion for example. The superficial layer with low friction coefficient can be printed onto or impregnated into the intermediate layer, preferably porous. The conical plain bushing 450 is therefore formed by a triple-layer structure.

By way of variant, the conical plain bushing 450 can be formed by depositing of the low friction coefficient material or 'sliding material', preferably synthetic, directly onto the core, for example made of metal and preferably made of steel. In this case the above intermediate layer is omitted. The conical plain bushing 450 is therefore formed by a bi-layer structure.

By way of another variant, the conical plain bushing 450 can be formed monolayer of a solid material with low friction coefficient, for example solid bronze, or bilayer from a layer of low friction coefficient material, for example bronze, deposited onto a core for example made of steel.

Phosphorous bronzes are particularly capable of sliding on steel.

The embodiment of the conical plain bushing shown in FIGS. 4 to 8 will now be described.

The conical plain bushing 450 is preferably formed by conical rolling from a flank made of metal.

Once it is formed, the angular opening of the bushing 450 is preferably between 30 and 60°, preferably of the order of 45°.

Angular opening of the bushing' means the angle A formed between the axis O-O of the machine and the conical faces 452, 454 of the bushing 450.

The conical plain bushing 450 according to the present invention has the form of a cone frustum. Its two main surfaces 452, 454 are truncated surfaces each delimited by a surface corresponding to a rectilinear guide or generator curve centered on a center which corresponds after installation to the axis O-O and rests on a circle which corresponds to the radially external periphery of the bushing 450.

The surface 452 is a concave surface directed towards the conical bearing seat 350 of the cylinder block 334. The surface 454 is a convex surface, parallel to the surface 452, directed towards the conical bearing seat 120 of the housing 100.

In the attached figures, the radially external edge of the conical plain bushing is referenced 456 and the radially internal edge of the same conical plain bushing 450 is referenced 458.

The radial extent of the conical plain bushing 450 can form the subject of many variant embodiments, as a function of the configuration of the machine, especially of its cubic capacity and the load it must support and drive.

By way of non-limiting example, the radius R3 of the radially external edge 456 of the bushing 450 is between 1.5 and 10 times the radius R4 of the radially internal edge 458 of the bushing 450, highly preferably between 3 and 6 times the radius of the radially internal edge 458 of the bushing 450.

Also, the distance D between the radially external edge 456 and the radially internal edge 458 of the conical bushing 450, which corresponds to the radial width of the conical bushing 450, can be between 25% and 75% of the distance between the axis O-O and the radially external edge 456 of the bushing, or the radius R3.

Figure 4:
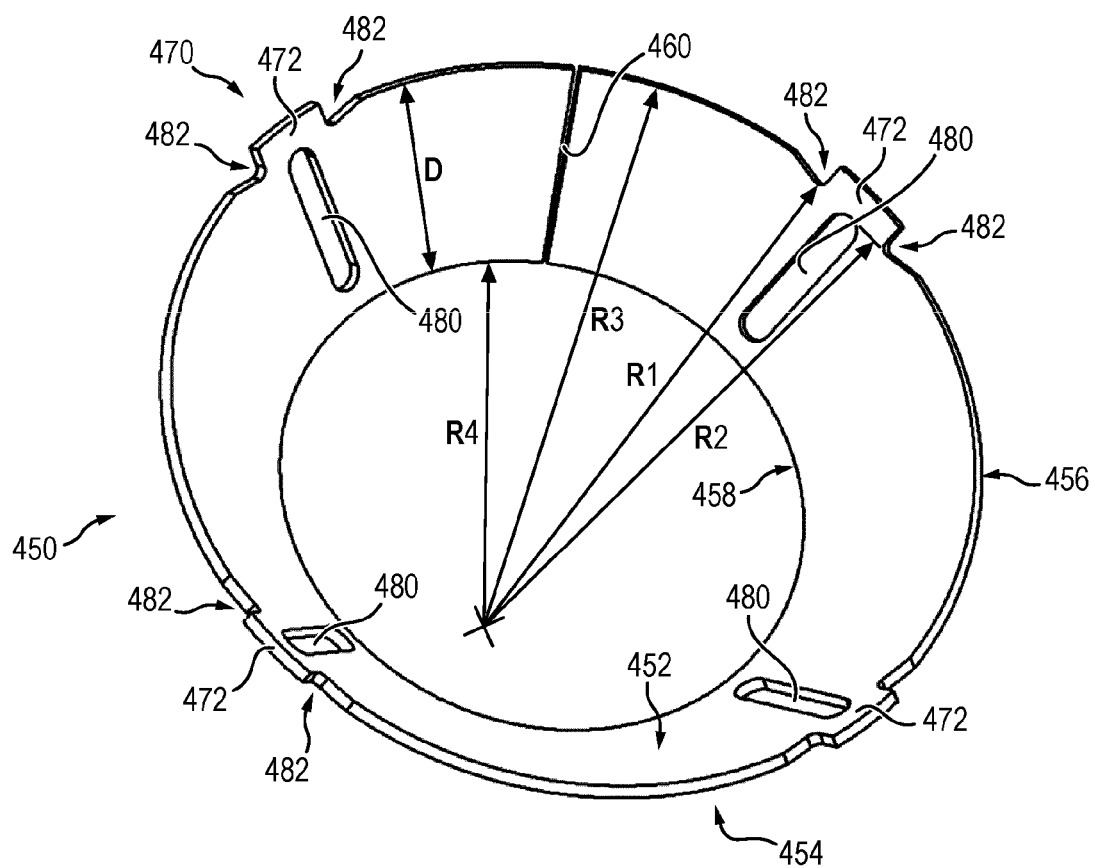
FIG. 4 illustrates a view in perspective of a conical plain bushing according to the present invention.

The attached figures show, especially FIG. 4, a radial through-slot 460. This slot 460 is delimited after conical rolling by the two end edges of the initial flank forming the bushing 450, initially opposite and apart, but brought together by the rolling.

Within the scope of the invention, this slot 460 participates in the circulation of oil between the radially external edge 456 and the radially internal edge 458, and in this way in the circulation of oil over the entire internal surface of the conical bushing 450 during relative rotation between the cylinder block 334 and the conical plain bushing 450.

The slot 460 in fact defines a vein which extends over the entire radial extent of the conical plain bushing 450 and fills with oil over this entire radial extent. This radial oil vein is swept by the opposite conical bearing seat 350 formed on the cylinder block 334, during relative rotation, such that the oil covers the entire surface of the conical plain bushing 450 adjacent to the conical plain bushing 450.

According to the particular embodiment shown in the figures, the conical bushing 450 has its concavity directed towards the cylinder block 334.

The conical bushing 450 is preferably chased in a recess 122 formed in the housing 100 in the region of the above bearing seat 120.

Figure 7:
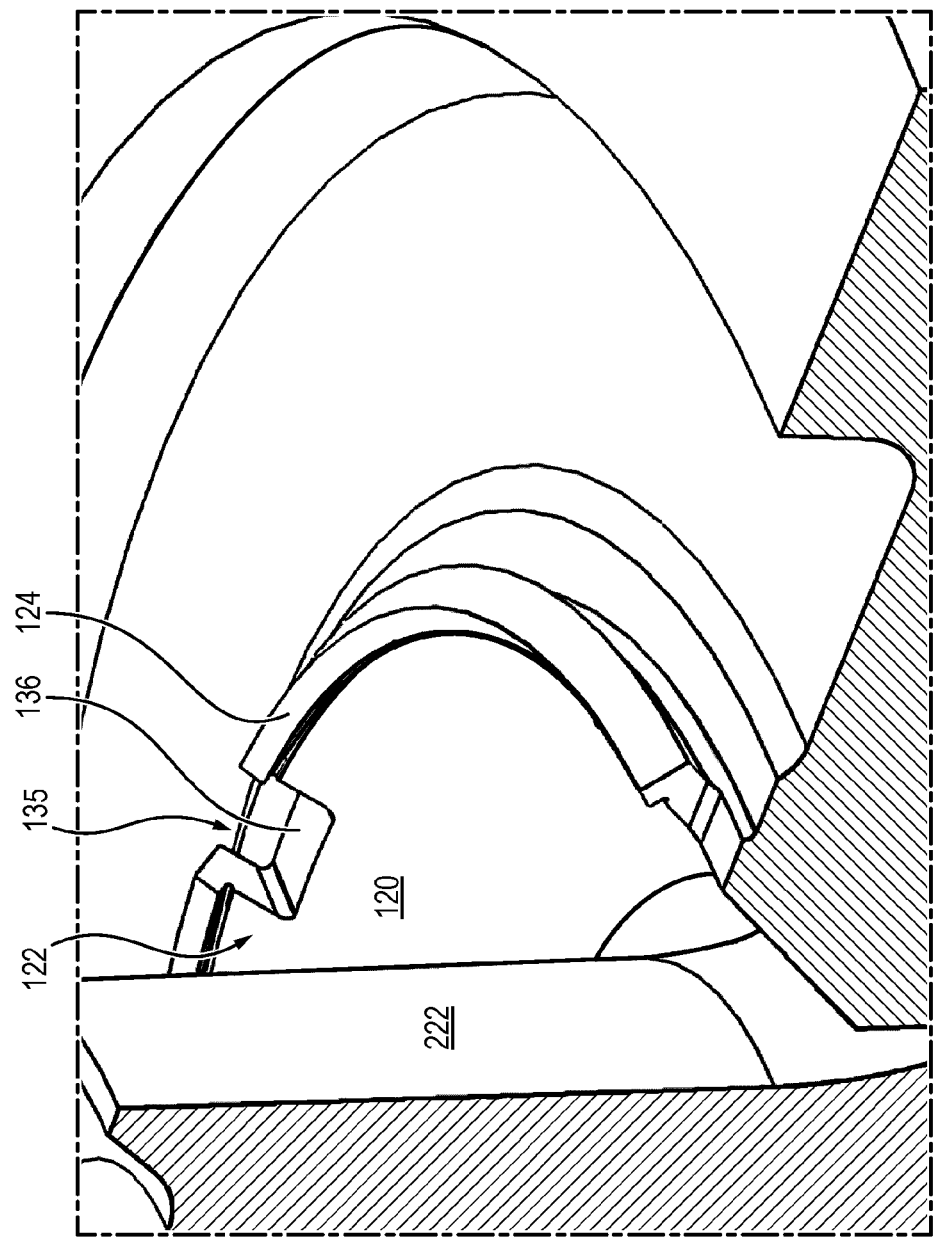
FIG. 7 illustrates a partial view in perspective of the recess support of a conical plain bushing formed in a housing element.

This recess 122 seen in FIG. 7 is adapted to radially wedge the conical bushing 450. The recess 122 has preferably at least one low wall or rim projecting relative to the above conical bearing seat surface 120. In FIG. 7, such a low wall has been referenced by the reference 124 in the region of the radially external periphery of the recess 122. As a variant, a low equivalent wall 124 could be provided in the region of the periphery radially internal of the low wall 122.

The skilled person will understand that this low wall 124 imposes the radial positioning of the conical plain bushing 450 in the recess 122 and prevents the conical bushing 450 from shifting obliquely relative to the axis O-O, especially when the distributor 332 ceases at rest to apply pressure to the cylinder block 334 and consequently when the cylinder block 334 ceases stressing the conical plain bushing 450.

Figure 5:
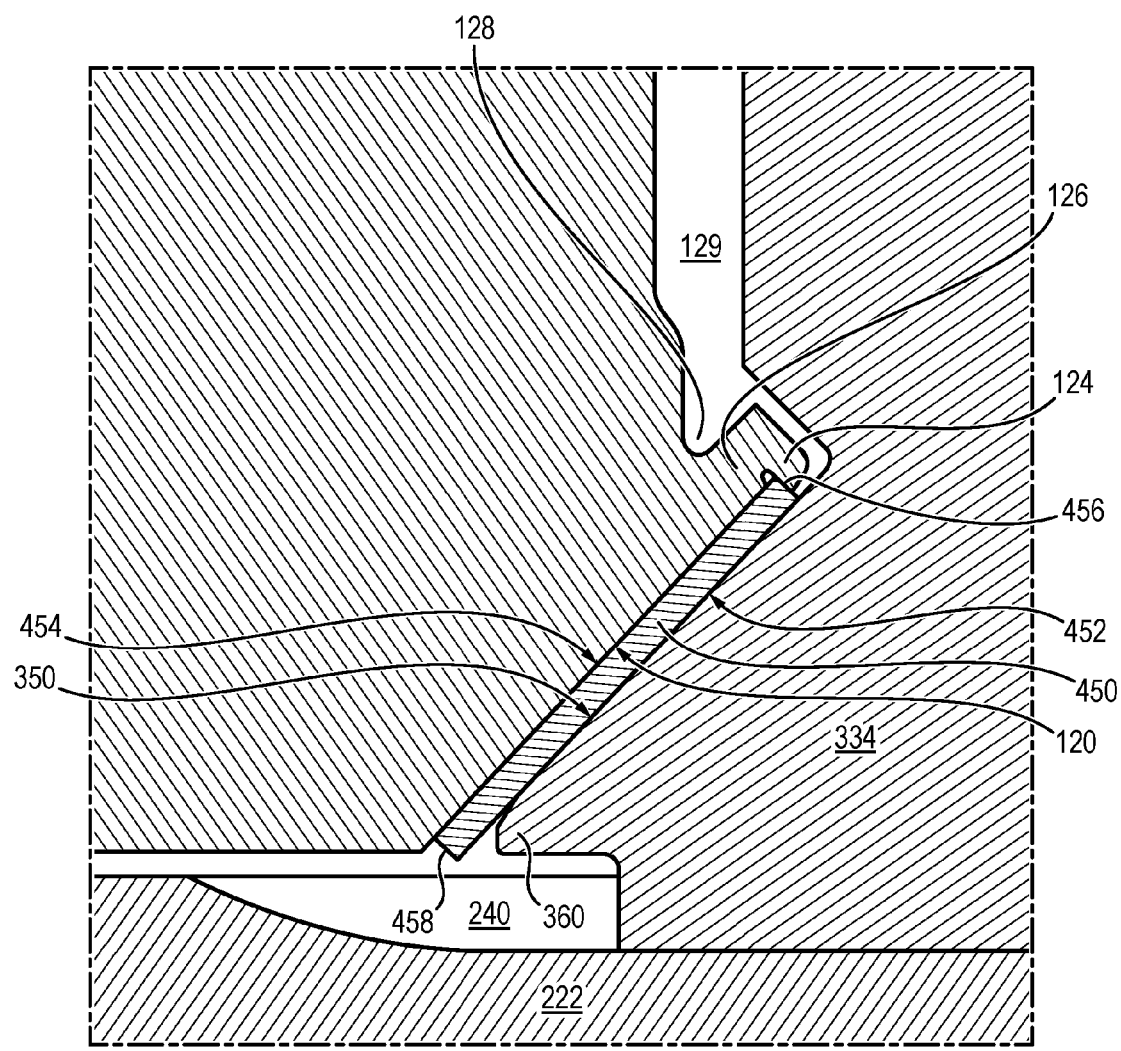
FIG. 5 illustrates a partial view in longitudinal axial section of a hydraulic machine according to the invention and more precisely illustrates the positioning of the conical plain bushing according to the invention between a cylinder block and a housing element.

With respect to FIG. 5 it is also clear that the part of the housing 100 which defines the radially external end of the recess 122 and consequently the low wall 124 has on the rear of this low wall 124, that is, opposite the recess 122, a clearance 128 which defines a zone of material 126 of minimal width or amplitude between the body of the housing, more precisely the lateral element 116, and the surface 120 of the recess 122.

In other terms, due to the clearance 128, the low wall 124 is formed on a wall 126 of minimal thickness.

This clearance 128 permits a certain articulation or deformation of the zone of the housing defining the low wall 124 by flexion and consequently permits a certain bending under pressure and accordingly a drop in pressure on the adjacent edge, in this case, the radially external edge 456 of the conical plain bushing 450.

Figure 6:
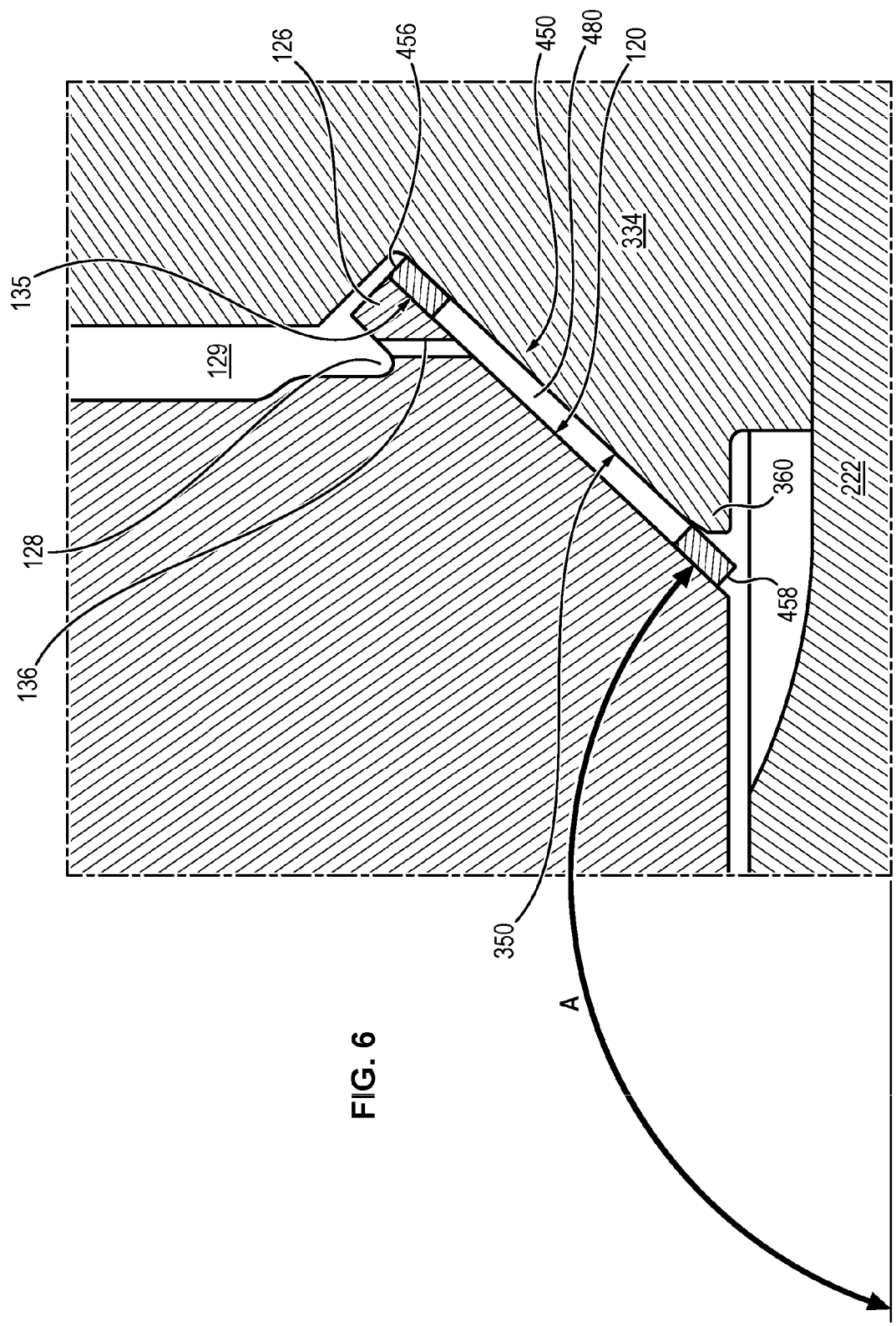
FIG. 6 illustrates a view similar to FIG. 5 according to a radial cutting plane passing through an oblong lumen made in the mass of the conical bushing to ensure transfer of oil.

FIGS. 5 and 6 as attached show that on the other side of the conical bushing 450, that is, in the region of its radially internal edge 458, the cylinder block 334 has a rounded clearance 360, qualified as 'drop' by the person skilled in mechanics. The rounded clearance 360 is arranged radially on the outside of the radially internal edge 458 of the bushing in the extension of the conical bearing seat 350 formed on the cylinder block 334 in the region of the radially internal periphery of the conical bearing seat 350. In other terms, the edge 360 of the cylinder block 334 is at the same time rounded and arranged on a radius greater than the radially internal edge 458 of the conical bushing 450. This arrangement allows the pressure applied by the cylinder block 334 to the conical bushing 450 to fade out progressively on the radially internal edge 458 of the bushing 450, upstream of its radially internal edge 458.

From observing the attached figures the skilled person will also understand that the low wall 124 is defined by a surface inclined relative to the axis O-O and in the region of its free edge consequently defines a radius less than the external radius of the radially external edge 456 of the conical bushing 450. Therefore, to introduce the conical plain bushing 450 into the recess 122, due to the presence of the low wedging wall 124, it is necessary for the bushing 450 to have sufficient elasticity to allow its deformation to permit its insertion into the recess 122. This elasticity can be due to the intrinsic material of the conical bushing 450. It is reinforced by the presence of the above through-slot 460.

The conical plain bushing 450 has also means 470 ensuring immobilisation in rotation relative to one of the housing 100 or the adjacent cylinder block 334, preferably relative to the housing 100.

Such anti-rotation means 470 can form the subject of many embodiments.

According to the illustration given in the attached figures, the anti-rotation means 470 are formed by tabs 472 projecting over the radially external edge 456 of the conical bushing 450.

More precisely still, according to the particular non-limiting embodiment shown in the attached figures, the means 470 comprise several tabs 472, for example four tabs 472, projecting radially to the outside and distributed uniformly around the axis O-O.

The low wall 124 is fitted with radial grooves 135 distributed uniformly around the axis O-O, in number and according to angular distribution identical to the tabs 472, to each receive a tab 472.

The conical bushing 450 shown in the figures also comprises means, in addition to the slot 460, ensuring distribution of the oil in which the conical bushing 450 brushes over the entire concave surface adjacent to the cylinder block 334 during relative rotation between the cylinder block 334 and the conical bushing 450.

The slot 460 participates in this distribution of oil by allowing transfer of fluid between the radially external edge 456 and the radially internal edge 458 of the conical bushing 450 and by defining a radial oil vein swept by the cylinder block 334.

According to the invention also however the presence of additional lumens 480, 482 and 484 distributed over the conical bushing 450 is noted; these allow a link between at least one of the radially external or internal peripheries of the conical bushing 450 and the concave surface of the bushing.

Even more precisely, according to the particular non-limiting embodiment shown in the attached FIGS. 4 to 8, the conical bushing 450 comprises at least one rectilinear oblong lumen 480 formed radially in the mass of the conical bushing 450, preferably opposite each of the tabs 472.

In this way four oblong radial lumens 480 distributed uniformly over the periphery of the conical bushing are provided according to the embodiment illustrated in FIG. 4.

Formed in the mass of the conical bushing 450' means that the lumens 480 pass through the thickness of the conical bushing 450 and therefore connect the two faces 452 and 454, however without terminating on the radially external periphery 456, or on the radially internal periphery 458 of the conical bushing 450.

Also, the conical bushing 450 comprises at least one notch on one of its peripheral edges, in this case according to FIGS. 4 to 8, on the peripheral external edge 456. These notches are referenced 482 in the attached FIG. 4.

More precisely still, two notches 482 are provided on either side of each of the anti-rotation tabs 472 respectively.

Also, the largest radius R2 of the oblong lumens 480 is greater than the smallest radius R1 of the base of the notches 482.

Therefore, the oil reaching the base of the notches 482 is swept by the cylinder block 334 during relative displacement between the cylinder block 334 and the bushing 450 and covers part of the radius of the bushing 450. It can also be directed towards the oblong lumens 480 to then near completely cover the surface concave of the bushing 450.

It is also evident that the largest radius R2 of the oblong lumens 480 formed in the conical bushing 450 is arranged opposite grooves 136 formed in the housing in the region of the recesses 135 receiving the anti-rotation tabs 472. These grooves 136 pass through the walls 126 and accordingly let the oil travel from the chamber 129 defined between the lateral housing element 116 and the cylinder block 334, towards the lumens 480.

Therefore on the radially external side 456 of the conical bushing 450 the oil can enter via these grooves 136 and the notches 482 in the oblong lumens 480.

On the radially internal side 458, as seen in FIG. 6, the oblong lumens 480 preferably extend radially towards the inside, that is, in the direction of the axis O-O, beyond the drop or rounded edge 360 formed in the cylinder block 334.

Therefore the oil which travels by way of the oblong lumens 480 can escape radially towards the inside in the region of this rounded edge 360.

The radially external notches 482 and the oblong lumens 480 together form oil veins which extend over almost the entire radial extent of the conical bushing 450 and permit complete lubrication of the surface 452 of the bushing 450 swept by the cylinder block 334 when the machine is running.

Figure 8:
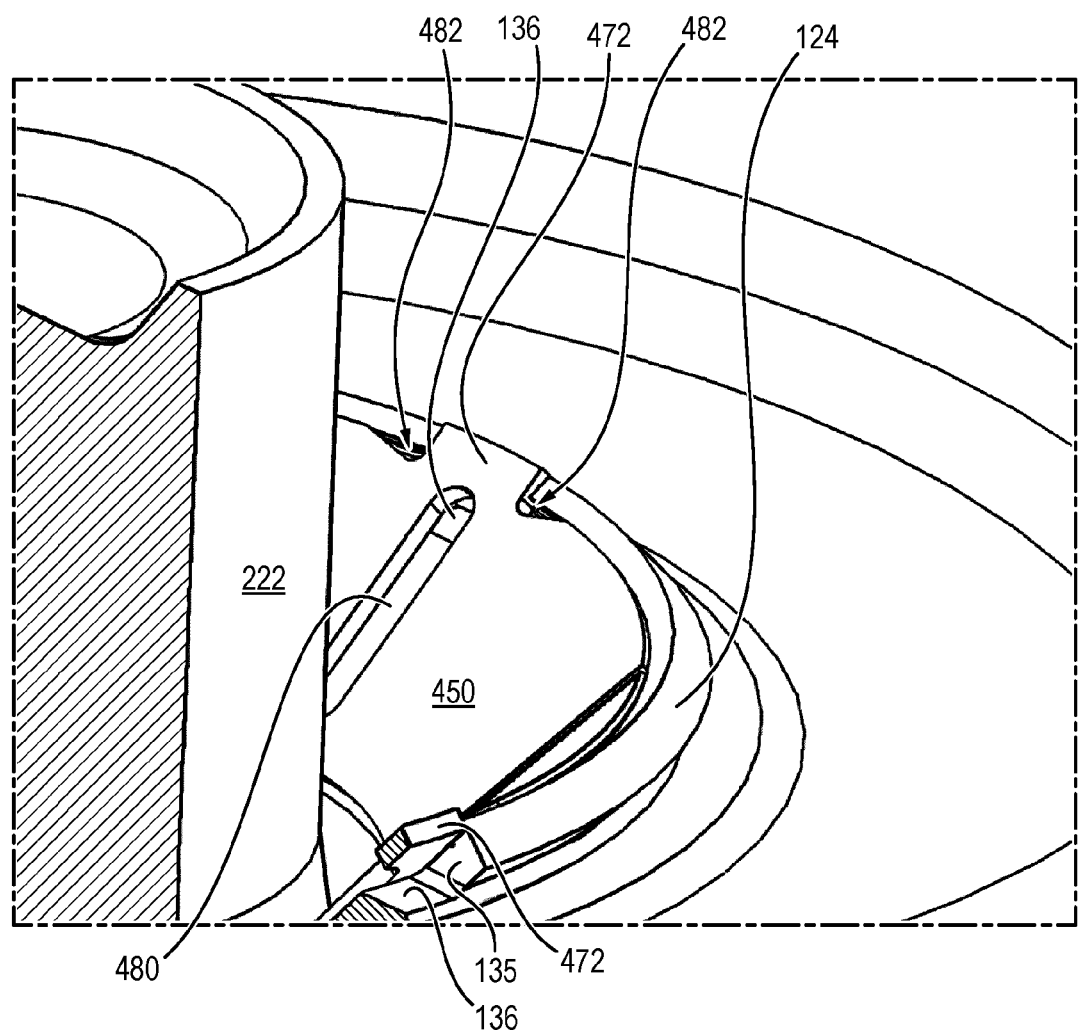
FIG. 8 illustrates a view similar to FIG. 7 after the placing of a conical plain bushing.

FIG. 8 shows the inlet oil into the oblong lumens 480 formed by the grooves 136 under the tabs 472. The same FIG. 8 shows the low stop wall 124 of the conical plain bushing 450 which prevents the bushing 450 from exiting when there is no axial pressure applied by the distributor 332.

The 'drop' or clearance system 360 and/or the low wall system 124 can be placed variously on the radially external edge 456 or on the radially internal edge 458 of the conical plain bushing 450.

Figure 9:
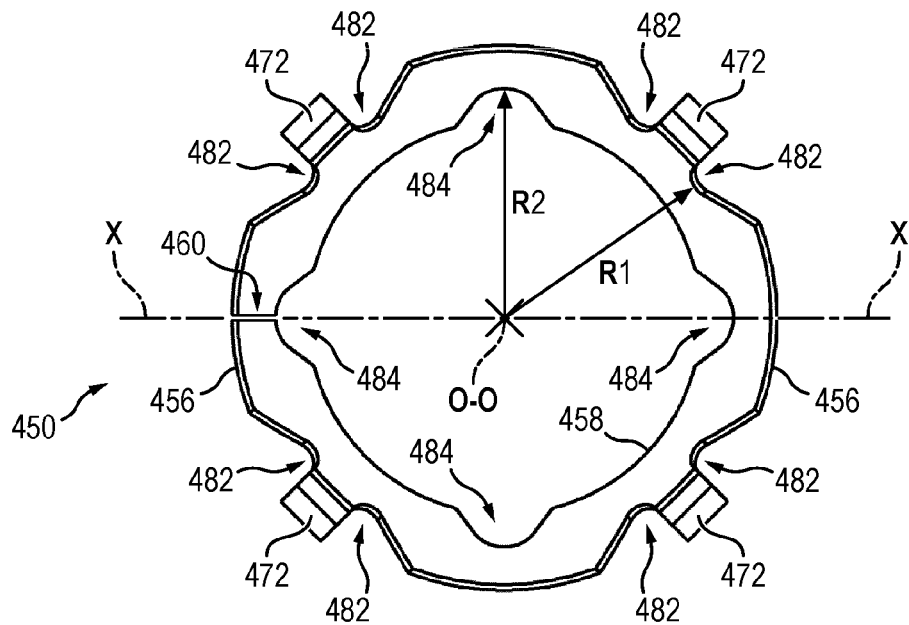
FIG. 9 illustrates a plan view of a conical plain bushing according to another variant embodiment of the present invention.
Figure 10:
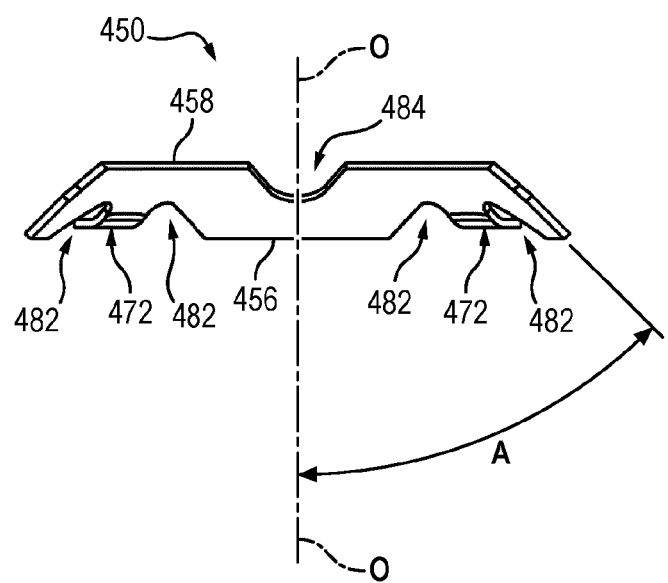
FIG. 10 illustrates a view in transversal section of the conical plain bushing of FIG. 9 according to the section plane referenced X-X in FIG. 9.

FIGS. 9 and 10 illustrate a variant embodiment of the conical bushing 450 according to the present invention, showing a washer in the form of a cone frustum having a radial through-slot 460, anti-rotation means formed in this case by four tabs 472 projecting onto the radially external periphery 456 of the bushing and notches 482 formed on the radially external periphery 456 of the bushing on either side of the anti-rotation tabs 472. The conical bushing 450 also comprises notches 484 formed on the radially internal edge 458 of the bushing. In particular, the conical bushing 450 can comprise four notches 484 distributed uniformly around the axis O-O, in quincunx with the four tabs 472, that is, offset angularly by 45° relative to the tabs 472. Therefore according to the embodiment of FIGS. 9 and 10, the oblong lumens 480 made in the mass of the bushing are replaced by the notches 484 terminating on the radially internal edge 458 of the bushing.

Here too, the largest radius R2 of the radially internal notches 484 is greater than the smallest radius R1 of the notches 482 formed on the radially external edge 456. Therefore, the oil which reaches the base of the radially external notches 482 is swept by the cylinder block 334 during displacement in relative rotation and can reach the radially internal notches 484 by sweeping the entire surface of the conical bushing 450. The radially internal notches 484 can also be fed by the above grooves 136 formed in the base of the recesses 135 receiving the tabs 472.

When they are filled with oil the notches 482 and 484 form, as the embodiment previously described with respect to FIGS. 4 to 8, veins of oil which cover the entire radial extent of the conical plain bushing 450.

By way of non-limiting example the opening angle A of the conical plain bushing 450 illustrated in FIGS. 9 and 10 can be between 30 and 60°, preferably of the order of 45°, the radius R3 of the radially external edge 456 being typically between 40 and 60 mm, advantageously of the order of 47.5 mm, while the radius R4 of the radially internal edge 458 is typically between 25 and 50 mm, advantageously of the order of 35 mm.

The conical plain bushing 450 absorbs the axial and radial forces as pointed out previously. Since the cylinder block 334 is thrust against the conical plain bushing 450 by the distributor 332, it is always supported against this conical plain bushing 450 and the latter can absorb the radial forces. The conical plain bushing 450 cancels out all clearances and enables proper centering without influencing adjusting of the bearing of the rollers 442, that is, its clamping (necessary tension or pre-loading so that the tapered bearing 442 has no axial play).

The clamping or axial pre-loading of the bearing 442 and of the conical plain bushing 450, intended to ensure pretension or pre-stress, can be achieved by any appropriate means. It consists of tensioning of the shaft 222 ensuring that the bearing means 400 and 450 are always supported.

According to the embodiment illustrated in FIG. 3, this clamping or axial pre-loading is executed by a clamping system 270 comprising an elastic stop ring 272 placed in an additional throat formed on the periphery of the shaft 222, in the region of the interface between the cylinder block 334 and the distributor 332.

The shaft 222 is also shouldered and on its distal end has a section 223 which acts as axial support to the bearing 442. Therefore it is understood that the axial stack formed by the bearing 442, the housing element 116, the bushing 450 and the cylinder block 334 is sandwiched between the above shoulder 223 and the stop ring 272.

To assemble the machine, after stacking of the above pieces, the bearings 442 and 450 are pressed under tension, for example by pressing, then the stop ring 272 is placed in its reception throat formed in the shaft 200.

If needed, a ring 274 can be interposed between the stop ring 272 and the cylinder block 334 to adjust the axial clamping or pre-loading.

Of course the stop ring 272, if needed linked to the spacer ring 274, can be replaced by any equivalent means, for example a system of threaded axial stop, such as a threaded ring.

Figure 11:
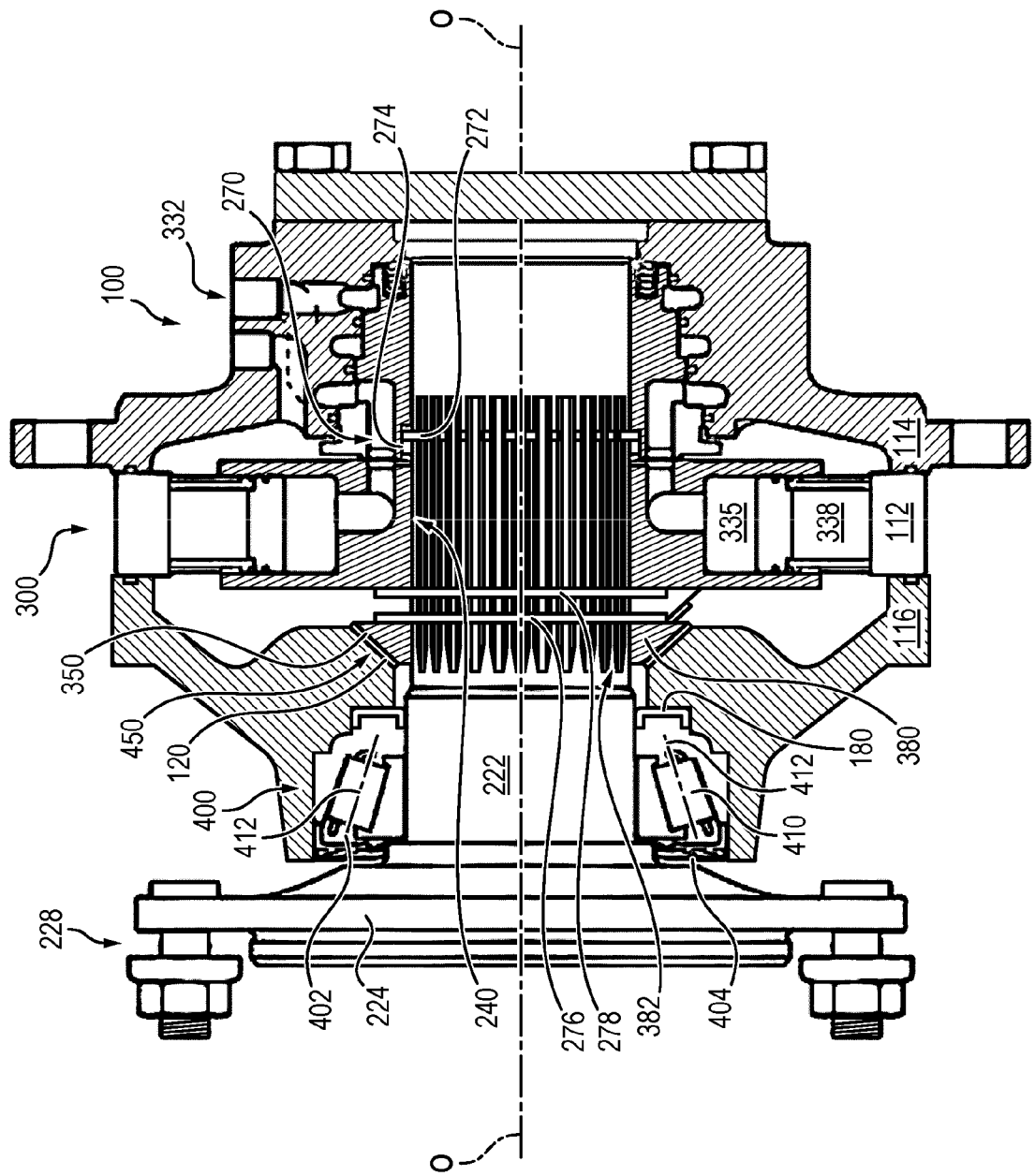
FIG. 11 illustrates a view in longitudinal axial section of a hydraulic machine according to a second embodiment of the present invention.

FIG. 11 shows a variant embodiment of a hydraulic machine according to the present invention which is distinguished from the embodiment illustrated in FIG. 3 by the fact that the conical bushing 450 is not supported on the cylinder block 334, but is supported on a conical ring 380 linked rotationally to the shaft 222 by longitudinal splines 382.

The ring 380 is placed between the lateral housing element 116 and the cylinder block 334, at a distance from this block. It defines the conical bearing seat 350 which bears the bushing 450.

According to the embodiment shown in FIG. 11, the conical plain bushing 450 is placed in pretension, that is, pre-stressed by means of a clamping system 270 linked to the conical ring 380. This type of clamping system 270 can form the subject of many embodiments.

It is preferably constituted by a stop formed for example by an elastic ring or stop 276 connected axially to the shaft 222. The stop 276 can be linked to a ring or support piece, similar to the above spacer ring 274, interposed between the ring 380 and said stop 276.

The stop or abutment 276 can be formed by an elastic stop placed in a throat of the shaft 222 or by threaded means screwed onto the shaft 222, such as the above axial stop 272 with respect to FIG. 3.

After it has been assembled by axial stacking, the assembly of pieces making up the machine illustrated in FIG. 11, on the central section 222 of the shaft 200, the conical plain bushing 450 is placed under tension by pressing before positioning of the ring 276 constituting the stop means 270.

According to the embodiment illustrated in FIG. 11 the stop and the clamping axial of the ring 380 are separated from the axial stop of the cylinder block 334.

The cylinder block 334 is in turn preferably blocked axially by a stop 278 connected axially to the shaft 222 on the side distal of the cylinder block 334, that is, on the side of the cylinder block 334 directed towards the conical ring 380.

The stop or axial stop 278 linked to the cylinder block 334 can be formed by any appropriate means, here too for example a stop or elastic ring placed in a throat of the shaft 222 or threaded means screwed onto the shaft 222.

FIG. 11 shows the stop ring 272 connected axially to the shaft 222 on the proximal side of the shaft 222, in the region of the interface between the cylinder block 334 and the distributor 332. This stop 272 however is not obligatory within the scope of the embodiment shown in FIG. 11.

The above axial stacking making up the hydraulic machine illustrated in FIG. 11 comprises the shaft 200, the joint 404, the bearing 442, the joint 180, the lateral housing element 116, the conical plain bushing 450, the ring 380, the axial stop 276, the axial stop 278, the multilobed cam 112 and the cylinder block 334, the distributor 332 and the lateral housing element 114.

Execution of the embodiment shown in FIG. 11 also remains identical to that illustrated in FIG. 3.

Here too, use of a conical plain bushing 450 according to the invention at the same time absorbs the axial forces applied between the cylinder block 334 and the housing 100, in particular due to the distributor, and the radial forces caused especially by the cyclic displacement of the rollers 338 on the multilobed cam 112. The conical plain bushing 450 according to the invention now prevents any disruption of the roller bearing 442 and allows the latter to support considerable forces due to the accessory connected to the power take-off 228.

Figure 12:
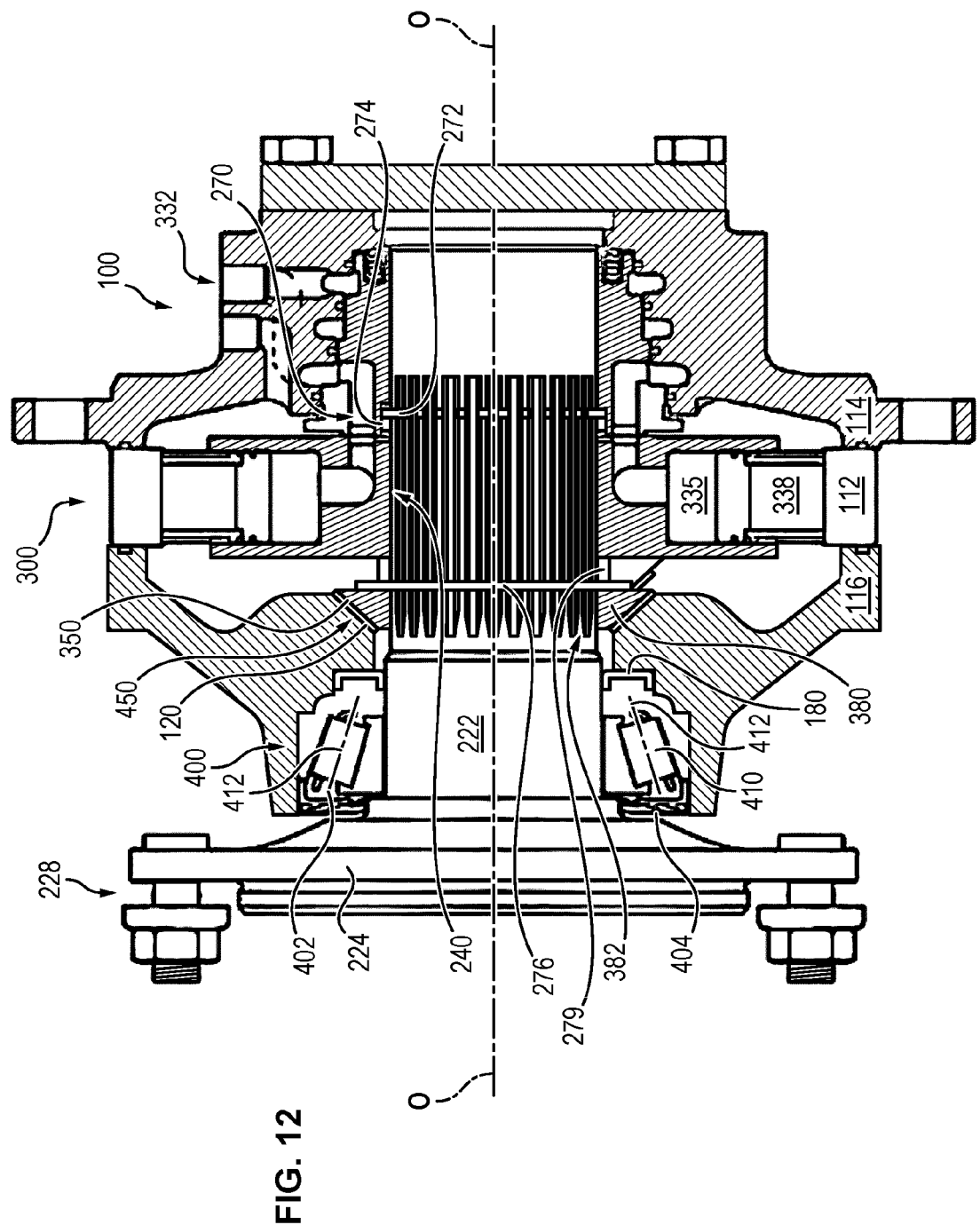
FIG. 12 illustrates a view in longitudinal axial section of a hydraulic machine according to a variant embodiment of the second embodiment of the present invention.

The variant embodiment illustrated in FIG. 12 is distinguished from the embodiment illustrated in FIG. 11 by the fact that the axial stop 278 formed by an elastic stop ring connected axially to the shaft 222 according to FIG. 11 is replaced by a ring 279 interposed between the axial stop 276 linked to the ring 380 and the cylinder block 334.

According to the embodiments in keeping with the invention illustrated in the attached figures, it is clear that the hydraulic machine according to the present invention comprises means forming bearings comprising the combination of a single roller bearing 442 and the conical plain bushing 450.

The present invention is of course not limited to the particular embodiments which have just been described, but extends to any variant according to its concept.

Embodiments of hydraulic machines comprising a bearing formed by a conical plain bushing 450 preferably linked to a tapered roller bearing 400/442 have been described previously. The invention however is not limited to this embodiment. Within the scope of the invention hydraulic machines can be equipped for example with two conical plain bushings 450 of the type previously described. In this case the machine preferably comprises only these two conical plain bushings 450 and therefore comprises no additional bearing. The two conical plain bushings 450 are preferably placed in the oil.

As pointed out previously, the present invention enables compact execution and reliable support of the shaft 200. In particular, it produces an axially very short bearing, with a large support surface, and reduced diameter. It therefore also reduces the diameter of the shaft. The cost of the bearing is accordingly lower.

Embodiments have been described previously in which the multilobed cam 112 is attached to the housing and radially external, and the cylinder block 334 is linked rotationally to the shaft and radially internal relative to the cam 112.

Of course, kinematics can be utilised. In other terms, the multilobed cam can be attached to the central shaft and therefore be radially internal and in this case the cylinder block is connected to the housing and placed radially on the outside of the multilobed cam.

Also, embodiments of hydraulic machines comprising an assembly 300 comprising radial pistons relative to the central axis O-O of the machine have been described previously.

By way of variant the invention also applies to hydraulic machines comprising an assembly 300 comprising axial pistons, that is, those which shift parallel to the central axis O-O of the machine. The general structure of such a hydraulic machine with axial pistons is well known per se to the skilled person. A relevant example is disclosed in document FR 2 298 017 in the name of the applicant. The architecture of hydraulic machines with axial pistons compatible with the invention and especially incorporating a conical plain bushing of the above type will therefore not be described hereinbelow.

As pointed out previously, the machine according to the present invention can be fitted with a brake interposed between an element of the housing 100 and an element of the shaft 200.

Such a brake preferably comprises discs stacked and connected alternatively in rotation with the element of the housing 100 and the element of the shaft 200. They are stressed at rest supported, or in braking position, by an elastic element, for example a Belleville spring washer.

More precisely preferably the elastic element acts on a piston supported on the stack of discs.

The brake can be controlled in a release position by application of pressure in a control unit or release unit which acts on the piston against the elastic element. The control release unit is arranged between the stack of discs and the load washer, more precisely between the stack of discs and the piston.

It is powered by any appropriate means.

The housing 100 could especially form the subject of many variant embodiments. The housing 100 could for example be according to the embodiment illustrated in general in FIG. 1, according to which the shaft comprises a central element and a radially external element and the housing comprises a longitudinal extension interposed between the central element and the radially external element, by arranging a conical plain bushing 450 according to the invention between an element of the housing 100 and an element of the shaft 200.

The power take-off 228 can be any type for driving in rotation. This can be a conical shaft output, or a pin, or a sprocket for a chain or a sprocket wheel. This can be also for example a flange intended to receive a vehicle wheel.

Machines in keeping with the invention are preferably reversible, and therefore function variously as pump or motor, and can also turn in two directions of rotation.

The invention claimed is:

1. A piston hydraulic machine comprising:
   a housing,
   a shaft mobile in rotation relative to the housing,
   a cam attached to one of the housing or the shaft,
   a cylinder block comprising pistons configured for being mobile in the cylinder block opposite the cam and for generating relative rotation between the cylinder block and the cam, the cylinder block being linked rotationally to other of the shaft or the housing, and
   means forming rotating guide bearings of the shaft relative to the housing,
   wherein the means forming rotating guide bearings comprise a conical plain bushing interposed between a housing element and an element linked rotationally to the shaft and
   wherein the conical plain bushing comprises:
   a radial slot;
   anti-rotation means relative to one of the housing element and the element linked rotationally to the shaft,
   the anti-rotation means being provided on a radial edge of the conical plain bushing; and
   lubricating fluid inlets adjacent to the anti-rotation means.

2. The piston hydraulic machine according to claim 1, wherein the conical plain bushing is interposed between the cylinder block and the housing element.

3. The piston hydraulic machine according to claim 1, wherein the conical plain bushing is interposed between the housing element and a conical ring linked rotationally to the shaft.

4. The piston hydraulic machine according to claim 1, wherein the conical plain bushing comprises means ensuring covering by a lubricating fluid over an entire surface of the conical plain bushing in relative displacement with respect to a facing piece.

5. The piston hydraulic machine according to claim 4, wherein the conical plain bushing comprises notches on at least one of its radially external edge and/or its radially internal edge to provide a lubricating fluid inlet onto the surface of the conical bushing.

6. The piston hydraulic machine according to claim 4, wherein the conical bushing comprises oil inlet notches on its radially external edge and complementary notches formed in its mass or on its radially internal edge.

7. The piston hydraulic machine according to claim 6, wherein a largest radius of the notches formed in the mass or on the radially internal edge of the conical bushing is greater than a smallest radius of the notches terminating on the radially external edge of the conical bushing.

8. The piston hydraulic machine according to claim 4, wherein the anti-rotation means are tabs provided on a radial edge of the conical bushing,
   the piston hydraulic machine comprising lubricating fluid inlet notches adjacent to the anti-rotation tabs.

9. The piston hydraulic machine according to claim 1, wherein the anti-rotation means are tabs provided on a radial edge of the conical bushing, the piston hydraulic machine comprising lubricating fluid inlet notches adjacent to the anti-rotation tabs.

10. The piston hydraulic machine according to claim 1, wherein the anti-rotation means are projecting tabs, and wherein the conical plain bushing comprises radial oil passage lumens opposite the anti-rotation tabs.

11. The piston hydraulic machine according to claim 1, wherein the conical plain bushing comprises two sets of angularly offset and separated lumens or notches covering radial ranges which are superposed such that the lumens and notches in addition cover an entire radial extent of the bushing.

12. The piston hydraulic machine according to claim 1, wherein one of an elements adjacent to the conical plain bushing comprises a low stop wall of the conical plain bushing placed opposite one of its peripheral edges.

13. The piston hydraulic machine according to claim 12, wherein an element which defines a low wall comprises a clearance opposite the low wall allowing at least slight flexing under pressure to reduce pressure on edges of the bushing.

14. The piston hydraulic machine according to claim 1, wherein an element adjacent to the conical plain bushing has a clearance opposite the conical bushing avoiding direct support on the conical bushing over an entire radial extent thereof.

15. The piston hydraulic machine according to claim 1, further comprising a bearing arranged between the housing element and the shaft.

16. The piston hydraulic machine according to claim 1, wherein the conical plain bushing is claimed between the housing element and the cylinder block and comprises a clamping system with pre-tension of the shaft and of the cylinder block.

17. The piston hydraulic machine according to claim 1, wherein the conical plain bushing is placed in a fluid.

18. The piston hydraulic machine according to claim 1, wherein the anti-rotation means relative to a support element are in the form of at least one radial tab.

19. A conical plain bushing,
   the bushing being configured to equip a hydraulic machine,
   the hydraulic machine comprising:
   a housing,
   a shaft mobile in rotation relative to the housing,
   a cam attached to one of the housing or the shaft,
   a cylinder block comprising pistons configured for being mobile in the cylinder block opposite the cam and for generating relative rotation between the cylinder block and the cam, the cylinder block being linked rotationally to other of the shaft or the housing, and
   means forming rotating guide bearings of the shaft relative to the housing,
   wherein the means forming rotating guide bearings comprise the conical plain bushing interposed between a housing element and an element linked rotationally to the shaft,
   wherein the conical plain bushing comprises a radial slot,
   the conical plain bushing comprising:
   anti-rotation means relative to one of the housing element and the element linked rotationally to the shaft, the anti-rotation means provided on a radial edge of the conical bushing; and lubricating means ensuring covering by lubricating fluid over an entire surface of the conical plain bushing when the surface is in relative displacement with respect to a facing piece, the lubricating means being lubricating fluid inlets adjacent to the anti-rotation means.

20. The conical plain bushing according to claim 19, the lubricating means being notches on at least one of the radially external edge and/or the radially internal edge of the conical bushing to provide a lubricating fluid inlet onto a surface of the conical bushing.

21. The conical plain bushing according to claim 19, which comprises: anti-rotation means formed by tabs provided on a radial edge of the conical bushing, and the lubricating means being lubricating fluid inlet notches adjacent to the anti-rotation tabs.

22. The conical plain bushing according to claim 19, the lubricating means being oil inlet notches on the radially external edge of the conical bushing and complementary notches formed in the mass or on the radially internal edge of the conical bushing.

23. The conical plain bushing according to claim 22, wherein a largest radius of the notches formed in the mass or on a radially internal edge of the conical bushing is greater than a smallest radius of the notches terminating on the radially external edge.

24. The conical plain bushing according to claim 19, which comprises anti-rotation means formed by projecting tabs, and wherein the conical plain bushing comprises radial oil passage lumens opposite the anti-rotation tabs.

25. The conical plain bushing according to claim 19, the lubricating means being two sets of angularly offset and separated lumens or notches covering radial ranges which are superposed such that the lumens and notches in addition cover an entire radial extent of the bushing.

26. The conical plain bushing according to claim 19,
having an angular opening between 30 and 60°, and/or
a radius of a radially external edge between 1.5 and 10 times the radius of the radially internal edge, and/or
a distance between a radially external edge and the radially internal edge, which corresponds to a radial width of the conical bushing, between 25% and 75% of a distance between the axis O-O of the machine and the radially external edge of the bushing and/or
a radius of radially external edge between 40 and 60 mm, while the radius of the radially internal edge is between 25 and 50 mm.

27. The conical plain bushing according to claim 19, wherein a surface of the conical plain bushing configured to rest on an opposite surface in relative displacement in rotation exhibits a surface state with low friction coefficient obtained by surface treatment of the conical plain bushing or obtained by a choice of a material making up this surface.

28. The conical plain bushing according to claim 27, wherein the material making up the surface is selected in the group comprising:
a surface formed by a synthetic material with low friction coefficient,
a conical plain bushing composed of a core on which a layer of low friction coefficient material is deposited with interposition of an intermediate layer adapted to ensure adhesion of the low friction material such that the conical plain bushing is formed by a triple-layer structure,
a conical plain bushing formed by deposit of a low friction coefficient material directly onto a core such that the conical plain bushing is formed from a bi-layer structure, and
a conical plain bushing formed monolayer of a solid material with low friction coefficient.

29. A machine equipped with at least one hydraulic machine,
the hydraulic machine comprising:
a housing,
a shaft mobile in rotation relative to the housing,
a cam attached to one of the housing or the shaft,
a cylinder block comprising pistons configured for being mobile in the cylinder block opposite the cam and for generating relative rotation between the cylinder block and the cam, the cylinder block being linked rotationally to other of the shaft or the housing, and
means forming rotating guide bearings of the shaft relative to the housing,
wherein the means forming rotating guide bearings comprise a conical plain bushing interposed between a housing element and an element linked rotationally to the shaft and wherein the conical plain bushing comprises:
a radial slot;
anti-rotation means relative to one of the housing element and the element linked rotationally to the shaft,
the anti-rotation means being provided on a radial edge of the conical plain bushing; and
lubricating fluid inlets adjacent to the anti-rotation means.

30. A vehicle equipped with at least one hydraulic machine,
the hydraulic machine comprising:
a housing,
a shaft mobile in rotation relative to the housing,
a cam attached to one of the housing or the shaft,
a cylinder block comprising pistons configured for being mobile in the cylinder block opposite the cam and for generating relative rotation between the cylinder block and the cam, the cylinder block being linked rotationally to other of the shaft or the housing, and
means forming rotating guide bearings of the shaft relative to the housing,
wherein the means forming rotating guide bearings comprise a conical plain bushing interposed between a housing element and an element linked rotationally to the shaft and
wherein the conical plain bushing comprises:
a radial slot;
anti-rotation means relative to one of the housing element and the element linked rotationally to the shaft,
the anti-rotation means being provided on a radial edge of the conical plain bushing; and
lubricating fluid inlets adjacent to the anti-rotation means.

31. A construction machine equipped with at least one hydraulic machine, the hydraulic machine comprising:
a housing,
a shaft mobile in rotation relative to the housing,
a cam attached to one of the housing or the shaft,
a cylinder block comprising pistons configured for being mobile in the cylinder block opposite the cam and for generating relative rotation between the cylinder block and the cam, the cylinder block being linked rotationally to other of the shaft or the housing, and means forming rotating guide bearings of the shaft relative to the housing, wherein the means forming rotating guide bearings comprise a conical plain bushing interposed between a housing element and an element linked rotationally to the shaft and wherein the conical plain bushing comprises:

a radial slot;

anti-rotation means relative to one of the housing element and the element linked rotationally to the shaft, the anti-rotation means being provided on a radial edge of the conical plain bushing; and lubricating fluid inlets adjacent to the anti-rotation means.

* * * * *